June 20, 1961 E. J. DIEBOLD 2,989,161
ELECTROMAGNETIC CLUTCH WITH STATIONARY COIL
Filed Nov. 25, 1955 4 Sheets-Sheet 2

INVENTOR.
EDWARD JOHN DIEBOLD
BY Ostrolenk, Faber, Gerb & Soffen
ATTORNEYS

INVENTOR.
EDWARD JOHN DIEBOLD
BY
ATTORNEYS

June 20, 1961 E. J. DIEBOLD 2,989,161
ELECTROMAGNETIC CLUTCH WITH STATIONARY COIL
Filed Nov. 25, 1955 4 Sheets-Sheet 4

INVENTOR.
EDWARD JOHN DIEBOLD
BY Ostrolenk, Faber, Gerb & Soffen
ATTORNEYS

United States Patent Office 2,989,161
Patented June 20, 1961

2,989,161
ELECTROMAGNETIC CLUTCH WITH STATIONARY COIL
Edward John Diebold, Ardmore, Pa., assignor to I-T-E Circuit Breaker Company, Philadelphia, Pa., a corporation of Pennsylvania
Filed Nov. 25, 1955, Ser. No. 548,801
9 Claims. (Cl. 192—84)

My invention relates to electromagnetic clutches, and more specifically to an electromagnetic clutch having an energizing coil which encircles the clutch laminations, the magnetic flux for operating the clutch into and out of engagement flowing in only one direction through the clutch laminations.

The principle of my invention is to provide an electromagnetic clutch wherein the magnetic core and energizing coil magnetize the laminations directly without detour through an inefficient magnetic circuit. Hence the flux for attracting alternate laminations goes through the laminations in only one direction to thereby decrease leakage flux and provide and equal and undiminishing field through each of the clutch laminations.

I further utilize an energizing coil which is stationarily mounted to thereby eliminate slip rings and brushes.

This direct magnetization of the laminations is accomplished by positioning the laminations concentrically within the energizing coil as will be shown hereinafter in several specific embodiments.

It is to be noted that the use of a unidirectional flux through the laminations which is inherent when the laminations are positioned within the energizing coil provides the further advantage of simplifying the lamination design since the flux cannot be short-circuited by the laminations. Similarly, the portion of the magnetic core which rotates with the laminations can now be a solid piece and the annular insulating insert need not be provided.

Clearly my novel electromagnetic clutch wherein a unidirectional flux originates directly in the laminations themselves could be applied to an electromagnetic clutch of the type wherein the energizing coil is a rotatable one.

Accordingly, a primary object of my invention is to provide an electromagnetic clutch in which the energizing coil generates a magnetic flux directly in the laminations themselves.

Another object of my invention is to provide an electromagnetic clutch having a unidirectional field in the laminations.

Another object of my invention is to provide an electromagnetic clutch having a stationary coil for directly magnetizing a rotatable stack of laminations.

Another object of my invention is to provide an electromagnetic clutch wherein the energizing coil is stationarily mounted to thereby avoid the use of slip rings and brushes for the energization of the coil.

Still another object of my invention is to provide an electromagnetic clutch wherein the flux through the alternate laminations is unidirectional to thereby eliminate leakage flux in the laminations.

Another object of my invention is to provide an electromagnetic clutch wherein the magnetic flux through the laminations is unidirectional to thereby allow a simplified construction for the laminations which are incapable of short-circuiting the magnetic circuit.

A still further object of my invention is to provide an electromagnetic clutch wherein the flux through the alternate laminations is unidirectional to thereby provide a homogeneous field which is equally distributed over the area of lamination, an equal field from lamination to lamination, and a full field in laminations which can be larger than the field in the magnetic core.

Still another object of my invention is to provide an electromagnetic clutch wherein the magnetic core which forms a portion of the magnetic circuit is comprised of a stationary portion and a movable portion, the stationary portion containing the energizing coil and the movable portion being directly impinged upon the laminations.

A still further object of my invention is to provide a magnetic structure for an electromagnetic clutch which comprises a stationary portion for housing the energizing coil and a movable portion which is connected to the stationary portion by a relatively small air gap, this movable portion being rotatable with the clutch laminations.

Another object of my invention is to magnetically isolate the magnetic circuit of an electromagnetic clutch.

Another object of my invention is to make all adjacent components of the magnetic circuit of an electromagnetic clutch of non-magnetic material.

A further disadvantage of the prior art clutches is that the armature which compresses the interleaved laminations is made in a single piece. Normal operation of the clutch always causes unequal radial wear along the surfaces of the laminations. The single piece armature causes a stronger force along the inner diameter of the clutch laminations than on the outer diameter thus preventing the laminations from operating over the whole active area.

I propose the use of a first and second concentric armature which bear the laminations independently to thereby assure a constant force over the lamination surfaces in conjunction with a clutch which may have a stationary coil and a unidirectional flux path through the laminations.

Accordingly a still further object of my invention is to provide an armature for forcing the interleaved laminations together which is made of independent concentric sections to thereby assure an equally distributed force over the lamination surfaces.

These and other objects of my invention will become more apparent from a description of preferred embodiments of my invention when taken in connection with the drawings in which.

Figure 1:
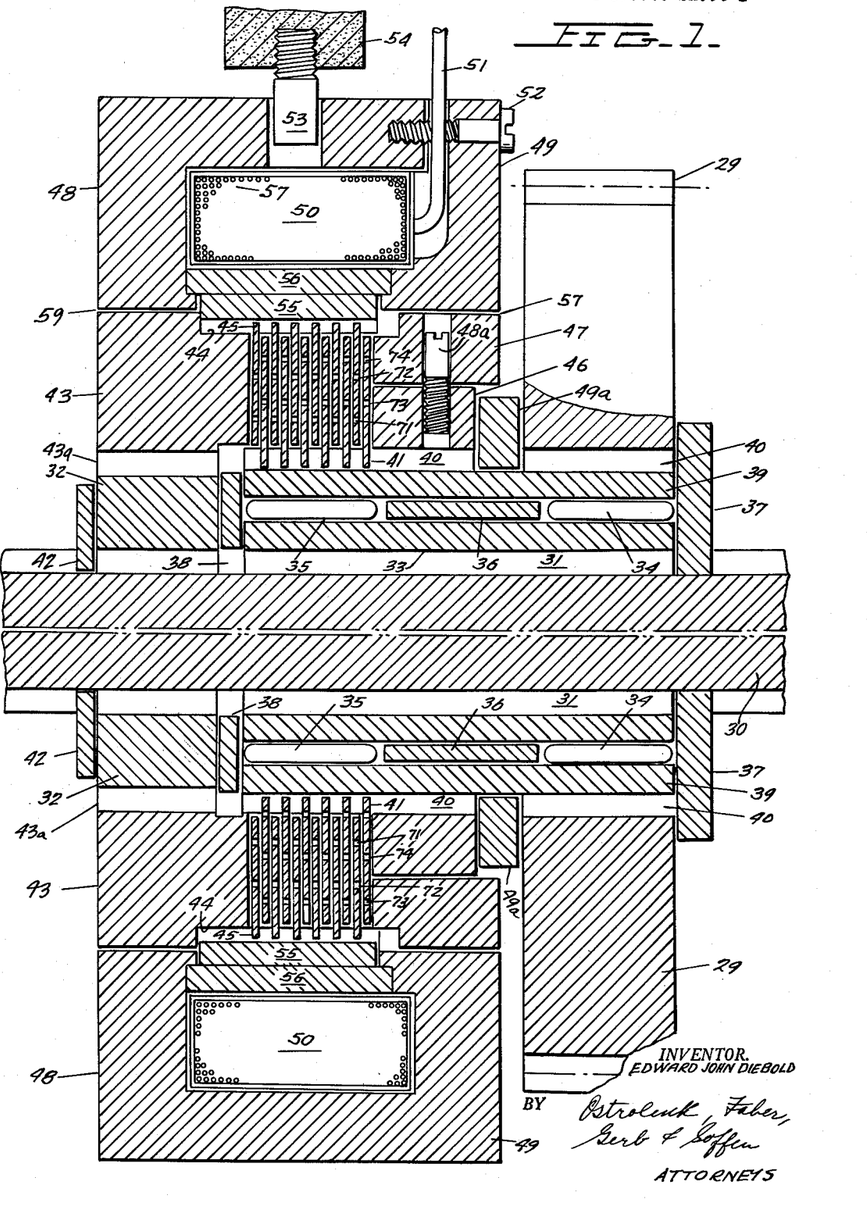
FIGURE 1 shows one embodiment of my invention wherein the electromagnetic clutch has a stationary coil and a magnetic circuit for directly magnetizing the laminations.
Figure 2:
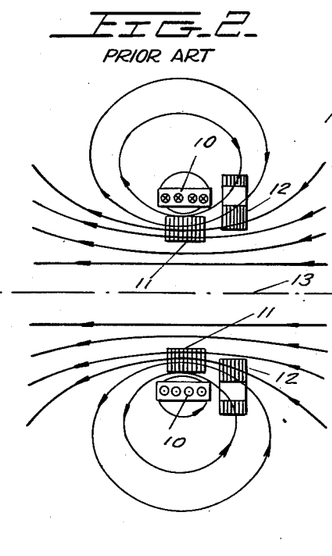
FIGURE 2 is a schematic representation of my invention wherein the energizing coil encircles the magnetic laminations as contrasted to having the magnetic laminations outside of the energizing coil.

FIGURE 2 in illustrating one of the main features of my novel invention shows the coil 10 surrounding a stack of laminations 11. A second stack of laminations 12 is also shown, these laminations being positioned in accordance with prior art principles. The stack of laminations 11, as will be shown and more completely described in conjunction with FIGURE 1, is entirely surrounded by the coil 10. The curved lines symmetric to the central line 13 in FIGURE 2 are the undisturbed lines of magnetic flux in air.

A clutch is operated by the frictional forces between laminations, such as laminations 11 or 12, these forces being caused by a mutual attraction of the laminations which is due to the magnetic field. According to well known laws of physics, the attraction between ferromagnetic bodies is proportional to their area of contact times the square of the magnetic field intensity through this area. It is of greatest importance that the magnetic field crosses perpendicularly to the areas of contact between the bodies and does not go along the body itself because then the field does not cause any force between the bodies but only magnetizes them internally.

The stack of laminations 11 shown in FIGURE 2 is magnetized in exactly the correct way. The magnetic lines cross the body from lamination to lamination, each line having gone through all the laminations and no lines going through the lamination in a radial direction. The stack of laminations 11 in FIGURE 2, therefore, contains the strongest available magnetic field and in exactly the correct direction. It is obvious that this stack of laminations will be strongly subjected to a compressing force, and that this force will be constant along the stack. Therefore all laminations will be compressed with the same force. It is to be noted that this field is correct although only a coil and laminations are shown and an iron core is absent.

In considering the stack 12 which is situated near the coil 10 but is axially spaced from the coil, it is apparent that the magnetic field also crosses this stack but now the field lines are much less concentrated and, particularly on the outer rim of stack 12, move in the wrong direction. That is, the magnetic lines go in the direction of the laminations themselves but not across them.

In summary, it is seen that the stack 12 will be magnetized much less than stack 11. The direction of the magnetization in stack 12 is not correct and the flux through the laminations 12 will be unequally distributed as is seen in FIGURE 2. Since the mutual attraction of the laminations is proportional to the square of the magnetic field density directly across the laminations, stack 12 will be subjected to a much smaller force than the laminations of stack 11 and consequently will act much less efficiently as a clutch.

It is seen therefore that in accordance with my novel principles the active part of the clutch, which is the stack of laminations, is situated entirely within the energizing coil of the clutch. By this arrangement a simple device is obtained in which a number of ring-shaped laminations are stacked into a cylindrical stack, this stack of laminations being entirely surrounded by a coil of larger diameter and greater length than the stack of laminations.

The magnetic field produced by the coil surrounding the stack of laminations forces a magnetic field through the stack of laminations which is substantially parallel to the axis of the coil and substantially perpendicular to the plane of the lamination. The magnetic field thus produced in the lamination is greater than the magnetic field produced by a coil of the same number of turns situated anywhere in space with respect to the lamination. The gain in magnetic field strength and magnetic field uniformity is very great and represents a very great advantage because the force is proportional to the square of the flux. It is conceivable that a magnetic field strength of equal magnitude in some parts but not of equal uniformity can be produced in laminations arranged similar to the coil 10 and the stack of laminations 12 of FIGURE 2, but then a coil which is very much larger is required which entails the drawback of a much larger magnet structure and much greater power losses, while still losing clutch power in the parts which have a lesser magnetic field strength.

Figure 3:
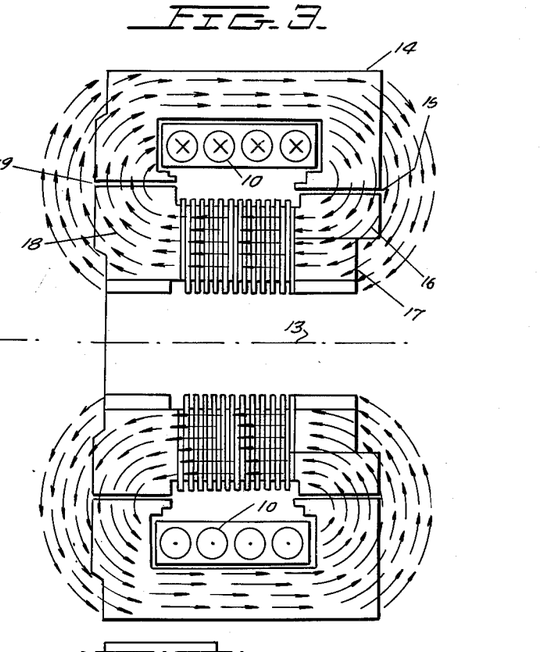
FIGURE 3 shows a simplified version of the clutch of FIGURE 1 where the salient features are more easily seen.

FIGURE 3 shows an extension of FIGURE 2 where a magnetic structure comprising stationary structure 14, air gap 15, armature rings 16 and 17, rotatable structure 18 and air gap 19, is included and operated in accordance with the principles of FIGURE 2.

As was the case with FIGURE 2, the coil 10 has many turns, only four of them being shown. At the top of the figure the current in the coil 10 is going away from the observer and in the bottom of the figure is coming towards the observer. The small arrows inside the parts show the magnetic field direction at that point. This magnetic field is very similar to the magnetic field in air as shown in FIGURE 2. The effect of the high permeability of the iron parts of the magnetic circuit, however, permits the flux to flow easily in the iron instead of taking up all of the space as it would in the absence of a magnetic structure.

FIGURE 3 further shows the magnetic leakage flux which passes out of the magnetic structure. This leakage flux by-passes some of the magnetic circuit without affecting the flux in the laminations. That is, the leakage flux does not have any ill effect upon the useful flux in the stack of laminations since the coil 10 magnetizes the stack of laminations directly without losing any flux whatsoever. This is a very great advantage and basically different from all other clutch designs in which a large portion of the flux produced by the coil is by-passed from the stack of laminations. Because the force increases with the square of the flux, the loss due to leakage flux was very great in the prior art clutches and could not be neglected.

FIGURE 1 specifically shows an embodiment of my invention which operates in accordance with the principles described above in conjunction with FIGURES 2 and 3, where it is desired to selectively fasten a driven member such as gear 29 to a coaxial driving member such as the shaft 30.

It is seen that the shaft 30 is constructed to have splines 31 therearound by which non-magnetic bushings 32 and 33 are splined to the shaft 30. Bushing 33 has a hardened race on its outer side and serves as a needle bearing race for the needles 34 and 35.

The needles 34 and 35 are then axially spaced by a brass spacer ring 36 which is positioned between them, and the brass rings 37 and 38 which enclose the end of the race provided by bushing 33.

The outer race for the needles 34 and 35 is provided by the hardened non-magnetic bushing 39 which bears a spline 40 on its outer side. Non-magnetic bushing 39 is then fastened to the driven member or gear 29 and the clutch inner laminations 41 by means of the spline 40. The inner laminations 41 however are splined in a manner to be axially movable with respect to the shaft 30. Hence it is seen that the assembly comprising the gear 29, bushing 39 and inner laminations 41 is free to rotate about the shaft 30 on the needle bearings 34 and 35.

The bushing 32 is axially held in place on the shaft 30 by means of a brass snap ring 42. The rotating magnetic structure 43 of the clutch is then splined to the bushing 32 by means of the spline 43a and the magnetic structure 43 contains a spline 44 which fastens it to the spline bushing 55 which, by means of the same spline 44, fastens it to the outer laminations 45 of the electromagnetic clutch. However, as was the case with the inner laminations 41, the outer laminations 45 are axially movable with respect to the shaft 30. Hence the brass bushing 32, rotating magnetic structure 43 and outer laminations 45 are directly attached to the shaft 30 for rotation therewith.

A first and second concentric armature ring 46 and 47 are held in their respective concentric positions by means of a screw 48a and are splined to the bushing 39 by means of the spline 40 in such a manner as to be axially movable with respect to the shaft 30. As will be shown hereinafter, this novel feature of making the armature in a first and second section allows equal wear over the surfaces of the laminations 41 and 45. The spacer ring 49a is then inserted in a circular slot in the spline 40 of bushing 39 to prevent axial movement of the armature rings 46 and 47 in the direction of the gear 29.

Hence the first leg of a magnetic circuit, the parts of which are rotatable with respect to the shaft 30, is defined as comprising the magnetic structure 43, laminations 41 and 45, and armature rings 46 and 47.

The stationary magnetic structure is then shown as comprising the magnetic body 48 and magnetic body 49 which contain the stationary energizing coil 50. It is to be noted that the coil 50 can now be directly energized through insulated leads 51 (which go directly to an energy source which is not shown) and the necessary slip rings and brushes used in the case of clutches having a rotating coil are avoided.

After insertion of the coil into the magnetic body 48, the magnetic body 49 is used to complete the stationary magnet circuit and is maintained in place by means of screws 52 or by any other desired means, and the assembly of core 48 and 49 can be maintained stationary as by a protruding member 53 of a stationary member 54.

As further shown in FIGURE 1, the stationary magnetic structure is isolated from the movable magnetic structure by means of the hardened, non-magnetic, stainless steel bushing 55 which is splined to the rotating body 43 by means of spline 44 and its outer periphery is in turn surrounded by the bronze bearing bushing 56 which is non-rotating and is fixed within the magnetic bodies 48 and 49.

It is now clear that the complete magnetic circuit for the clutch will, upon energization of coil 50, be through the fixed magnetic bodies 48 and 49, the small air gap 57, the armature rings 46 and 47, the interleaved laminations 41 and 45, the magnetic body 43, the small air gap 59 and back to the magnetic body 48.

It is to be noted that the coil 50 completely surrounds the laminations 41, 45 and that the magnetic flux travels in only one direction through the lamination and that the leakage flux is negligible.

An essential feature of my novel invention is now apparent; that is, that the magnetic structure is isolated from other magnetic bodies to decrease leakage flux.

The laminations 41 and 45 are, as will be more fully described hereinafter, made from a hard magnetic machine steel. This steel has a much smaller permeability than the surrounding magnetic material of the magnetic structure but a sufficient permeability to permit easy flow of a strong magnetic flux across them when magnetized by a strong magnetomotive force as produced by the coil 50. According to the first novel feature described above, the coil 50, because it surrounds the stack of laminations 41, 45, magnetizes these laminations very strongly, and because these laminations are made from a steel which is hard and solid for the mechanical duty the laminations have to perform and because they are situated in a place where they would be very strongly magnetized, a very strong magnetic field will flow across them.

All the other magnetic parts of the magnetic circuit are made from a very soft and easily magnetizable material in such a way that the magnetic flux can flow very easily through those parts and therefore the magnetomotive force produced by the coil 50 can be concentrated entirely on this stack of laminations.

Referring to FIGURE 3, the fixed magnet body 14 is made of a very soft magnetic material and in the same way the main clutch body 18 and the two armature halves 16 and 17 are made from the same very soft magnetic material. On the other hand, laminations 11 are again made from a hard and magnetic machine steel. Between the non-rotating part and the rotating part of the clutch there are the air gaps 15 and 19. In order to reduce their high reluctance, these air gaps are made with a small radial spacing and the area of these air gaps is made larger than the cross-section area of the iron. With this it is possible to hold the necessary magnetomotive force, as produced in coil 10 and needed to pass the flux through the air gaps 15 and 19, to a very low value and again most of the magnetomotive force produced in coil 10 will be used to magnetize the stack of laminations 11.

Similar remarks are directed to the magnetic structure of FIGURE 1. However, it is seen in FIGURE 1 that all parts which are immediately adjacent to the important areas of the magnetic circuit, such as the bushing 56, spline bushing 55, internal bushing 40, internal spacer 32, bushing 33, ring 36 and the rings 37, 38 and 42, are all made from entirely non-magnetic materials such as hard non-magnetic stainless steel, bronze or brass.

This construction is required in order to prevent any kind of magnetic flux in ferromagnetic parts to flow away from the magnetic body and thus by-pass the stack of laminations. It is important to notice that the shaft 30 of FIGURE 1 and the gear 29 can be made of magnetic materials since both parts are far enough removed from the stack of laminations or in a position where their flux cannot hurt the flux going through the laminations. Due to this feature, the clutch operates as it is shown in FIGURE 3. That is, it behaves just as if it were alone in space and no fluxes, except that shown in FIGURE 3, occur. Because there are no loss fluxes or no leakage fluxes, the flux through the clutch is all useful flux which permits the clutch to attain the very high performance which can be predicted theoretically.

In view of the essential part taken by the clutch laminations 41 and 45, a more complete description thereof will be given in conjunction with FIGURES 4 and 5 before the operation of the clutch is considered.

Figure 4:
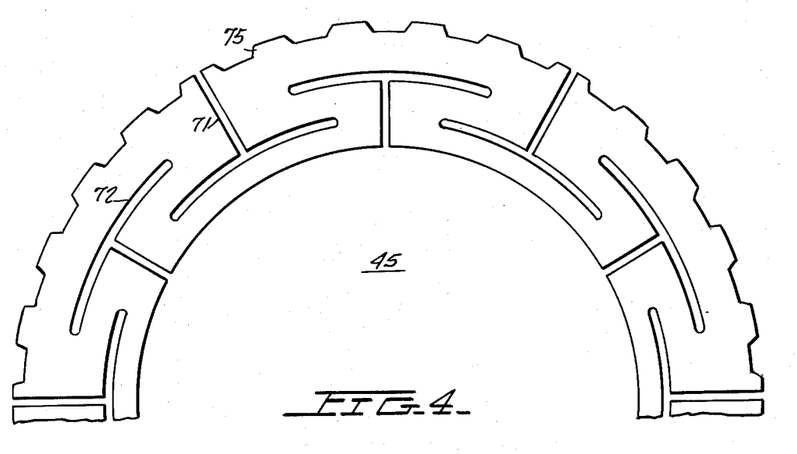
FIGURE 4 shows an outer lamination which could be used with the clutch of FIGURE 1.
Figure 5:
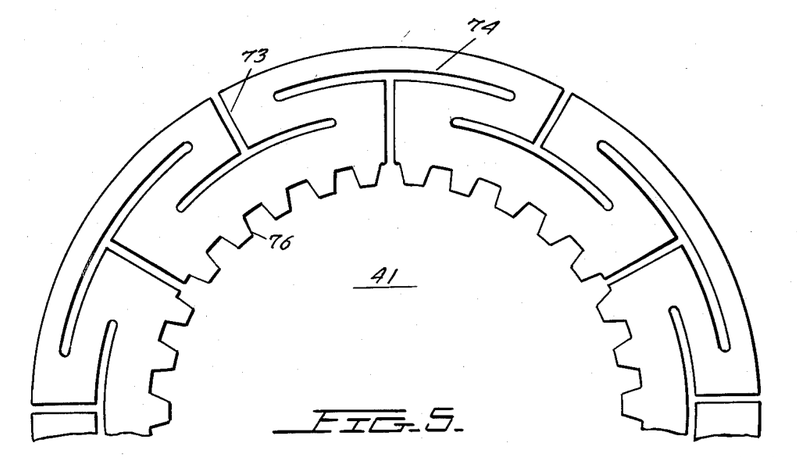
FIGURE 5 shows an inner lamination which could be used with the clutch of FIGURE 1.

The laminations of FIGURES 4 and 5 can be made from a medium carbon, strip-steel which could have a carbon content of .6% as an example. The laminations are punched and then hardened by heating them to a red heat and quenching in oil. After hardening, the outer laminations are annealed while in a flat position and therefore will be hard and flat.

The inner laminations 41 of FIGURE 5 could be mounted in a fixture which will hold them in a wavy shape and then annealed together with the fixture. Hence, after annealing, these laminations will retain the waviness. This waviness will subsequently serve as a spring to separate the laminations when the clutch is in its opened position or in disengaged position.

This action is essential since the laminations have the tendency to stick together because of the residual magnetic field and also because of the adhesion of the oil between the laminations. Thus, with the slight wave, a substantial force is exerted by the laminations to separate them from each other and allows the clutch to be opened very rapidly when the magnetic flux disappears.

The outer lamination 45 as shown in FIGURE 4 is shown as containing the slot 71 on the outer side and slot 72 on the inner side. Hence the steel which comprises the lamination has a zigzag shape to thereby form a lamination which is in one piece but is very flexible. Therefore, if during the clutching operation the lamination is suddenly heated and the heat does not appear on all of the parts at the same time, these slots will allow the lamination to expand without warping or breaking.

For example, the outer lamination 45 is assembled into the clutch of FIGURE 1 by inserting the spline 44 of bushing 55 into the groove 75 of the outer lamination 45 of FIGURE 4. Spline 44 does not, of course, partake in the action of the clutch and will therefore remain cold. Because of this, the lamination 45 has a tendency to expand on the inner circumference while the outer circumference undergoes little change.

However, slots 71 and 72 will permit this lamination to expand on the inner side without creating great stresses in the lamination.

Similar remarks can be directed to the inner lamination 41 of FIGURE 1 which is specifically shown in FIGURE 5. Here again T-shaped slots 73 and 74 are positioned on the outer and inner circumferences respectively. The laminations are assembled within the clutch of FIGURE 1 by providing the teeth 76 which will mesh with spline 40 of the brass bushing 39.

As was previously mentioned, the fit of both of the grooves 75 and 76 of both the inner and outer laminations 41 and 45 are manufactured to have a very loose fit upon splines 40 and 44 which may be made of hardened steel. This looseness is required because the laminations change temperaure very quickly and the expansion due to temperature changes should never force the splines to jam. Since the lamination is well splined, however, and each lamination carries only a small part of the torque, a very loose fit of the spline will not entail poor operation. Clearly the grooves 75 and 76 may be made as a gear spline which then makes the splines 40 and 44 a standard gear which can be manufactured by standard machines.

It is to be further noted that in view of the unidirectional magnetic field which will be carried by laminations 41 and 45, that their construction is extremely simplified since no steps need be taken to prevent the short-circuiting of the magnetic flux by these laminations.

As further shown in FIGURE 1, it is seen that the slots 71 and 72 of the outer lamination 44 and slots 73 and 74 of the alternate laminations 43 are not aligned when assembled within the clutch. The slots are positioned in this manner in order to prevent the engagement between slots of adjacent laminations in the case of warpage of the lamination.

Furthermore, the different arrangements of the slots on the inner and outer laminations also permits a better distribution of the forces and torques between laminations.

It is now possible to consider the operation of the electromagnetic clutch of FIGURE 1 when using the laminations such as the laminations 41 and 45 of FIGURES 5 and 4, respectively, as the clutching agent. Under idling conditions or conditions when the driven member of gear 29 is not attached to the driving member or the shaft 30, it is clear that the laminations 41 and 45 of FIGURE 1 are pushed away from one another in view of the wavy shape which can be imparted to the inner lamination 41 as was previously described.

Hence the shaft 30 drives the bushing 32, rotating magnetic structure 43 and the outside lamination 45 which are splined to the magnetic body 43 by means of spline 44. Since the laminations 41 and 45 are not frictionally engaged laminations 41 slide within the laminations 45 and gear 29 which is operatively connected to the laminations 41 is not driven.

When it is desired to connect the driven member 29 to the driving shaft 30, the coil 50 which is stationarily mounted within its magnetic structure is energized by means of the leads 51 which lead to an outside energizing source. Upon energization of the coil 50 a magnetic flux is formed inside the coil, i.e., in the stack of laminations 41 and 45. This magnetic flux closes itself outside the coil through the clutch body 43, the air gap 59, the stationary magnet 48, its cover 49, the air gap 57 and the armatures 46, 47.

In view of the magnetic flux which has now been initiated in only one direction through the laminations 41 and 45 and the armature rings 46 and 47, the armature and lamination will move axially in a direction to compress the laminations 41 and 45. That is, the magnetic forces cause the laminations and the armature to move close together.

The oil between the laminations is gradually expelled which causes the coefficient of friction to increase. An increasing normal force (the magnetic field) times an increasing coefficient of friction causes a very rapidly increasing tangential force between laminations. Because the two halves of the clutch turn at different speeds, this tangential force times the velocity of relative motion develops heat at the intersurface between laminations. This heat causes the oil to flow away rapidly and finally to boil and evaporate, leaving dry steel to rub dry steel. This is attained when the wavy laminations are pressed flat together with the flat lamination with a very great normal force; the surface properties of dry hot steel causing at the same time an extremely high coefficient of friction. (It increases from less than 1% to more than 30% in this process.) The torque transmitted by the clutch thus increases tremendously (several thousand times) and the clutch becomes one solidly closed body.

That is to say, a rigid connection now exists through shaft 30, bushing 32, rotating magnetic structure 43, spline 44, lamination 45, lamination 41, armature rings 46 and 47, bushing 39, and the gear 29. Obviously the gear 29 can be subsequently connected in any desired manner to a machine part which is to be selectively driven from the shaft 30.

In the operation of the electromagnetic clutch of FIGURE 1, several salient features are to be noted. The first is that the coil 50 completely encircles the laminations and flux through the inner and outer laminations 41 and 45 is substantially perpendicular thereto. This feature first allows the use of a relatively small coil 50, since it is clear that the leakage flux is greatly decreased. Secondly, since the lamination cannot short circuit a magnetic flux path which travels in only one direction, it is obvious that the structure of the laminations themselves can be quite simple, as was specifically shown with the laminations of FIGURES 4 and 5.

A further important feature to which my novel invention is directed and which will become obvious when considered in conjunction with the operation of the clutch in FIGURE 1, is that the armature rings 46 and 47 which are used to compress the laminations 41 and 45 are in fact two separate concentric rings. As a consequence of this, each of the rings 46 and 47 will press upon the laminations 41 and 45 with an equal force, thereby giving rise to equal wear between the lamination surfaces of the laminations 41 and 45. In contradistinction, the element corresponding to the armature rings of my invention in the prior art devices is only one piece. Therefore, since this piece may not come into an exactly parallel engagement with the laminations and also since adjacent laminations have different diameters, unequal wear on their surfaces resulted. Although I show this novel feature in conjunction with only two concentric rings, it is obvious that by increasing the number of rings I can increase the effect of distributed wear along the lamination surface.

As a further advantage which occurs in the use of a clutch such as the clutch shown in FIGURE 1, the leads 51 which are used to energize the coil 50 need not pass through slip rings or brushes since the coil 50 is stationarily mounted.

Figure 6:
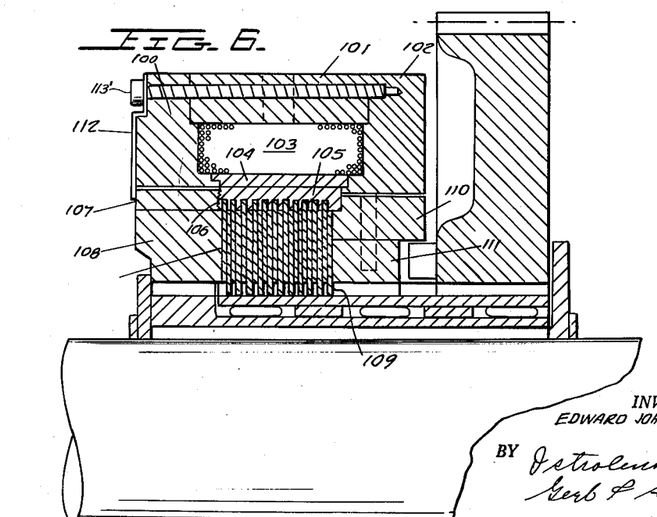
FIGURE 6 shows a second embodiment of my novel invention.

The embodiment of FIGURE 6 consists of a coil 103 surrounding a stack of laminations 109. The lamination stack 109 consists of outer laminations and inner laminations which could be the laminations shown in FIGURES 4 and 5. Coil 103 is surrounded by a ferromagnetic body which in this case is composed of bodies 100, 101 and 102 and is protected from the clutch by a slot cover bushing 104 which is preferably made from bronze or brass.

The assembly of these three parts (ferromagnetic body, coil and bushing) ride on the clutch, these parts not rotating but being guided by the rotating parts of the clutch. These parts ride on the spline bushing 105 which is fastened to the main body of the clutch 108.

Bushing 105 is made of a non-magnetic stainless steel and has a spline on the inside and a smooth surface on the outside. It guides the outer laminations on its spline and can transmit the full torque of the clutch. This bushing is copper brazed along the area 106 to the soft magnetic material bushing 107 which has the same shape. These two parts are made by brazing two raw pieces of metal together and then machining the assembly to high precision. Part 107 of this assembly is then fitted very tightly upon the main magnetic body 108 of the clutch. By this means it is possible to obtain a good flow of magnetic flux from part 100 through part 107 into part 108 while attaching part 105 very solidly to the main body 108. The torque of the clutch is then transmitted from the main body 108 through the spline bushing 105 into the outer lamination without having to cope with a leakage flux through a ferromagnetic body.

The fastening shown in FIGURE 6 is not necessarily the only one. It is, however, desirable because it combines the magnetic and non-magnetic properties together with very strong bonds and ease of manufacture. On the other side of the stack of laminations 109 of FIGURE 6 there is an armature which may be split into two parts 110 and 111. It is important that the non-rotating magnetic body and the rotating magnetic bodies, such as the non-rotating parts 100 and 102 and the rotating parts 107 and 110, have an appreciable air gap between them (.005 inch) so that they do not directly rub. All direct contact should occur between the bronze bushing 104 and the stainless steel bushing 105.

These metals are merely typical and are cited since they have good bearing properties and not being subjected to magnetic forces will not show any excessive wear. The armature 111 and the inner laminations are then splined together as shown and the main body of the clutch 108 can be fastened in any desired manner with another rotating part.

FIGURE 6 also shows washer 112 which prevents axial motion of the non-rotating parts of the clutch with respect to the rotating part of the clutch. More specifically, a bolt 113' is inserted through washer 112 and is fastened in member 102 to thereby maintain the non-rotating part of the clutch together.

It should be noted that the clutches shown herein are almost completely symmetrical with respect to the arrangement of coil and lamination. This design therefore will not show any axial force between the rotating and non-rotating part which thus prevents axial rubbing or axial displacement between these parts.

Figure 7:
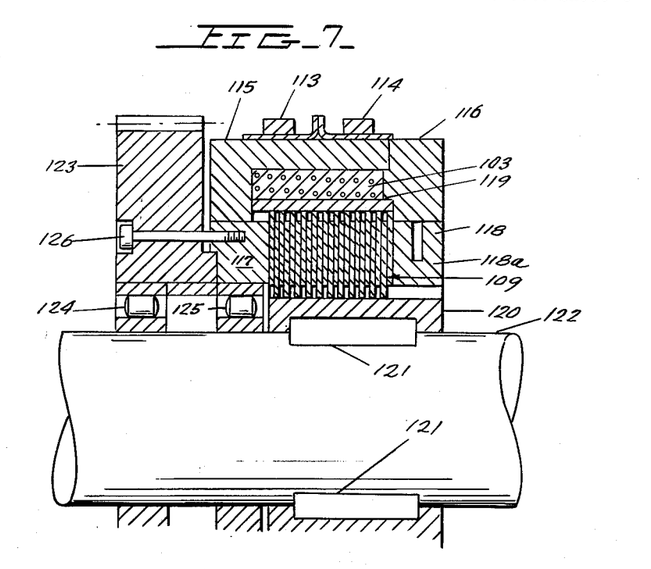
FIGURE 7 shows a still further embodiment of my novel invention.
Figure 8:
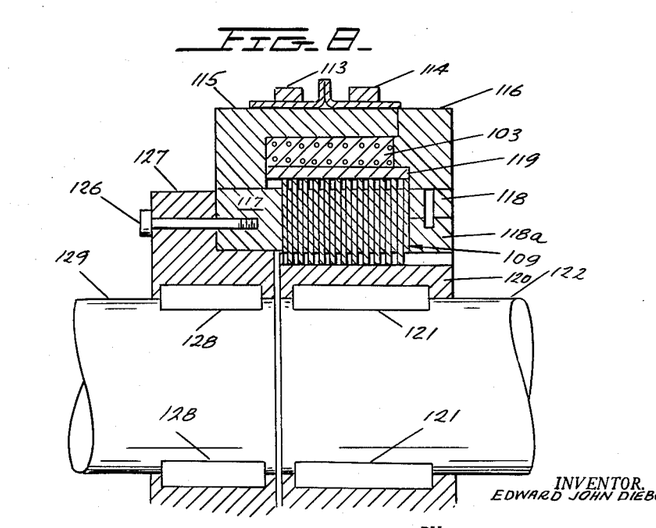
FIGURE 8 shows still another embodiment of my novel invention.

FIGURES 7 and 8 show two further variants of a clutch design in accordance with my invention, both of which have a rotating coil and two slip rings 113 and 114 to supply the power to the coil. The coil 103 is contained within a magnetic body, comprising body 115, cover 116, inner clutch body 117 and a split armature 118, 118a. The stack of laminations 109 is guided between an outer non-magnetic spline bushing 119 and an inner non-magnetic spline bushing 120 where bushing 120 is keyed to the drive shaft by the keys 121.

In FIGURE 7 the clutch may be used to couple a gear to the shaft 122. The gear 123 can rotate around this shaft on the bearings 124 and 125 and is fastened to the main clutch body by the bolt 126. When the clutch is open, all the parts of the clutch except the inner laminations, the spline bushing 120 and the keys 121, rotate freely around the shaft. When the clutch is energized, the whole mass becomes one solid piece.

FIGURE 8 shows a simple means to use the clutch of FIGURE 7 to couple two shafts 122 and 129. In this case the main clutch body is bolted to the hub 127 by the bolts 126 which is splined with the spline 128 to the driven shaft 129.

By using the design shown in FIGURE 6, the examples of FIGURES 7 and 8 can clearly be made with a non-rotating field coil.

In the foregoing I have described my invention only in connection with preferred embodiments thereof. Many variations and modifications of the principles of my invention within the scope of the description herein will now be obvious to those skilled in the art. Accordingly I prefer to be bound not by the specific disclosure herein but only by the appended claims.

I claim:

1. In an electromagnetic clutch having a rotating driving member and a driven member, said driven member being rotatable about the axis of rotation of said driving member, a first lamination being operatively attached to said driving member and being coaxial therewith, a second lamination being operatively attached to said driven member and being coaxial therewith, said first and second laminations being axially movable relative to one another to move into and out of driving engagement with one another to thereby operatively attach said driven member to said driving member when said first and second laminations are in the said engaged position, biasing means for normally biasing said first and second laminations out of the said engaged position and a magnetic circuit, said magnetic circuit comprising a rotatable magnetic structure, a stationary magnetic structure, and an energizing coil, said rotatable magnetic structure, stationary magnetic structure and energizng coil being constructed to be concentric with the axis of said driving member; said rotatable magnetic structure comprising a first portion and an armature being relatively movable with respect to one another in an axial direction; said first and second laminations being axially interposed between said first portion of said rotatable magnetic structure and said armature, said stationary magnetic structure being positioned to complete a magnetic circuit comprising the said stationary magnetic structure, armature, first and second laminations, first portion of rotatable magnetic structure, and back to said stationary magnetic structure, said energizing coil being coaxially positioned to encircle said first and second lamination and being energizable to circulate a magnetic flux through the said magnetic circuit, the said magnetic flux passing through said laminations in one direction to compress the said armature, first and second laminations and first portion of said rotatable magnetic structure into a compact relationship against the said biasing means for biasing said first and second laminations out of the disengaged position and into the said engaged position to thereby operatively attach said driving and driven members.

2. In an electromagnetic clutch having a rotating driving member and a driven member, said driven member being rotatable about the axis of said driving member, a first lamination being operatively attached to said driving member and being coaxial therewith, a second lamination being operatively attached to said driven member and being coaxial therewith, said first and second laminations being axially movable relative to one another to move into and out of driving engagement with one another to thereby operatively attach said driven member to said driving member when said first and second laminations are in the said engaged position, one of said first and second laminations being of a shape wherein the said laminations will weave into and out of a plane which is parallel to the plane of the said lamination to thereby form a biasing means for normally biasing the said first and second laminations out of the engagement, and a magnetic circuit, said magnetic circuit comprising a rotatable magnetic structure, a stationary magnetic structure and an energizing coil, said rotatable magnetic structure, stationary magnetic structure and energizing coil being constructed to be concentric with the axis of said driving member; said rotatable magnetic structure comprising a first portion and an armature being relatively movable with respect to one another in an axial direction, said first and second laminations being axially interposed between said first portion of said rotatable magnetic structure and said armature, said stationary magnetic structure being positioned to complete a magnetic circuit comprising the said stationary structure, armature, first and second laminations, first portion of rotatable magnetic structure and back to said stationary magnetic structure, said energizing coil being positioned to encircle said first and second lamination and being energizable to circulate a magnetic flux through the said magnetic circuit, the said magnetic flux passing through said laminations in one direction to compress the said armature, first and second laminations and first portion of said rotatable magnetic structure into a compact relationship against the said biasing means for biasing said first and second laminations out of the disengaged position and into the said engaged position to thereby operatively attach said driving and driven members.

3. In an electromagnetic clutch having a rotating driving member and a driven member, said driven member being rotatable about the axis of said driving member, a first lamination being operatively attached to said driving member and being coaxial therewith, a second lamination being operatively attached to said driven member and being coaxial therewith, said first and second laminations being axially movable relative to one another to move into and out of driving engagement with one another to thereby operatively attach said driven member to said driving member when said first and second laminations are in the said engaged position, a magnetic circuit, said magnet circuit comprising a rotatable magnetic structure, a stationary magnetic structure, and an energizing coil, said rotatable magnetic structure, stationary magnetic structure and energizing coil being constructed to be concentric with the axis of said driving member; said rotatable magnetic structure comprising a first portion and an armature being relatively movable with respect to one another in an axial direction, said first and second laminations being axially interposed between said first portion of said rotatable magnetic structure and said armature, said stationary magnetic structure being positioned to complete a magnetic circuit comprising the said stationary magnetic structure, armature, first and second laminations, first portion of rotatable magnetic structure and back to said stationary magnetic structure; said energizing coil being positioned on said stationary magnetic structure and external to said first and second laminations and being energizable to circulate a magnetic flux through the said first and second laminations in a direction substantially perpendicular to the plane of said first and second laminations.

4. In an electromagnetic clutch having a rotating driving shaft and a driven gear, said driven gear being rotatable about the axis of rotation of said driving shaft, a first lamination being operatively attached to said driving shaft and being coaxial therewith, a second lamination being operatively attached to said driven gear and being coaxial therewith, said first and second laminations being axially movable relative to one another to move into and out of driving engagement with one another to thereby operatively attach said driven gear to said driving shaft when said first and second laminations are in the said engaged position, biasing means for normally biasing said first and second laminations out of the said engaged position and a magnetic circuit, said magnetic circuit comprising a rotatable magnetic structure, a stationary magnetic structure, and an energizing coil, said rotatable magnetic structure, stationary magnetic structure and energizing coil being constructed to be concentric with the axis of said driving member; said rotatable magnetic structure comprising a first portion and an armature being relatively movable with respect to one another in an axial direction; said first and second laminations being axially interposed between said first portion of said rotatable magnetic structure and said armature, said stationary magnetic structure being positioned to complete a magnetic circuit comprising the said stationary magnetic structure, armature, first and second laminations, first portion of rotatable magnetic structure, and back to said stationary magnetic structure, said energizing coil being positioned on said stationary magnetic structure and being energizable to circulate a magnetic flux through the said magnetic circuit, the said magnetic flux passing through said laminations in a direction perpendicular to the plane of said first and second laminations to compress said armature, first and second laminations and first portion of said rotatable magnetic structure into a compact relationship against the said biasing means for biasing said first and second laminations out of the disengaged position and into the said engaged position to thereby operatively attach said driving shaft and driven gear.

5. In an electromagnetic clutch for selectively attaching a rotating driving member to a coaxial driven member wherein said driving member is operatively attached to an axially movable first lamination and said driven member is operatively attached to an axially movable second lamination, each of said first and second laminations being coaxial with said driving member and positioned adjacent to one another, a magnetic flux generating means and energizing means therefor, said magnetic flux generating means comprising a rotatable first portion for connecting one of said laminations to its driving member, a portion which is axially stationary with respect to said laminations and coaxial therewith and an armature which is axially movable with respect to said laminations and coaxial therewith; said armature being constructed in a first and second concentric ring, each of which are independently axially movable; said magnetic flux generating means being constructed to move said armature in the direction of said first portion responsive to generation of magnetic flux, said first and second laminations being positioned between said armature and said first portion to be compressed into driving engagement by said armature upon energization of said flux generating means, said first and second armature rings providing an equally distributed force over the engaged surface of said laminations, said flux through said laminations being in a direction perpendicular to the plane of said laminations.

6. In an electromagnetic clutch for selectively attaching a rotating driving member to a coaxial driven member wherein said driving member is operatively attached to an axially movable first lamination and said driven member is operatively attached to an axially movable second lamination, each of said first and second laminations being coaxial with said driving member and positioned adjacent to one another, compressible means for normally maintaining a substantial portion of the adjacent faces of said first and second laminations at a distance from one another, a magnetic flux generating means and energizing means therefor, said magnetic flux generating means comprising a portion which is axially stationary with respect to said laminations and coaxial therewith, a rotatable portion for connecting one of said laminations to its driving member and an armature which is axially movable with respect to said laminations and coaxial therewith; said armature being constructed of a first and second concentric ring, each of which are independently axially movable, said magnetic flux generating means being constructed to pass flux through said first and second laminations in a direction perpendicular to the plane of said first and second laminations whereby said armature is moved in the direction of said first portion responsive to generation of magnetic flux, said first and second laminations being positioned between said armature and said first portion to be compressed into driving engagement by said armature upon energization of said flux generating means, said first and second armature rings providing an equally distributed force over the engaged surface of said laminations.

7. In an electromagnetic clutch having a rotating driving member and a driven member, said driven member being rotatable about the axis of rotation of said driving member, a first plurality of laminations being operatively attached to said driving member and being coaxial therewith, a second plurality of laminations being operatively attached to said driven member and being coaxial therewith, said first and second plurality of laminations being axially movable relative to one another to move into and out of driving engagement with one another to thereby operatively attach said driven member to said driving member when said first and second plurality of laminations are in the said engaged position, the laminations of said first and second plurality of laminations being alternately positioned with respect to one another, biasing means for normally biasing said first and second plurality of laminations out of the said engaged position and a magnetic circuit, said magnetic circuit comprising a rotatable magnetic structure, a stationary magnetic structure, and an energizing coil, said rotatable magnetic structure, stationary magnetic structure and energizing coil being constructed to be concentric with the axis of said driving member; said rotatable magnetic structure comprising a first portion and an armature being relatively movable with respect to one another in an axial direction; said first and second plurality of laminations being axially interposed between said first portion of said rotatable magnetic structure and said armature, said stationary magnetic structure being positioned to complete a magnetic circuit comprising the said stationary magnetic structure, armature, first and second plurality of laminations, first portion of rotatable magnetic structure, and back to said stationary magnetic structure, said energizing coil being coaxially positioned to encircle said first and second plurality of laminations and being energizable to circulate a magnetic flux through the said magnetic circuit, the said magnetic flux passing through said plurality of laminations in one direction to compress the said armature, first and second plurality of laminations and first portion of said rotatable magnetic structure into a compact relationship against the said biasing means for biasing said first and second plurality of laminations out of the disengaged position and into the said engaged position to thereby operatively attach said driving and driven members.

8. In an electromagnetic clutch having a rotating driving member and a driven member, said driven member being rotatable about the axis of rotation of said driving member, a first lamination being operatively attached to said driving member and being coaxial therewith, a second lamination being operatively attached to said driven member and being coaxial therewith, said first and second laminations being axially movable relative to one another to move into and out of driving engagement with one another to thereby operatively attach said driven member to said driving member when said first and second laminations are in the said engaged position, biasing means for normally biasing said first and second laminations out of the said engaged position and a magnetic circuit, said magnetic circuit comprising a rotatable magnetic structure, a stationary magnetic structure, and an energizing coil, said rotatable magnetic structure, stationary magnetic structure and energizing coil being constructed to be concentric with the axis of said driving member; said rotatable magnetic structure comprising a first portion and an armature being relatively movable with respect to one another in an axial direction; said first and second laminations being axially interposed between said first portion of said rotatable magnetic structure and said armature, said stationary magnetic structure being positioned to complete a magnetic circuit comprising the said stationary magnetic structure, armature, first and second laminations, first portion of rotatable magnetic structure, and back to said stationary magnetic structure, said energizing coil being coaxially positioned to encircle said first and second lamination and being energizable to circulate a magnetic flux through the said magnetic circuit, the said magnetic flux passing through said laminations in one direction to compress the said armature, first and second laminations and first portion of said rotatable magnetic structure into a compact relationship against the said biasing means for biasing said first and second laminations out of the disengaged position and into the said engaged position to thereby operatively attach said driving and driven members, the portion of said driving and driven members attached to said first and second laminations being constructed of non-magnetic material whereby magnetic flux cannot by-pass said laminations.

9. In an electromagnetic clutch for selectively attaching a rotating driving member to a coaxial driven member wherein said driving member is operatively attached to an axially movable first lamination and said driven member is operatively attached to an axially movable second lamination, each of said first and second laminations being coaxial with said driving member and positioned adjacent to one another, compressible means for normally maintaining a substantial portion of the adjacent faces of said first and second laminations at a distance from one another, a magnetic flux generating means and energizing means therefor, said magnetic flux generating means comprising a portion which is axially stationary with respect to said laminations and coaxial therewith and an armature which is axially movable with respect to said laminations and coaxial therewith; said armature being constructed of a first and second concentric ring, each of which are independently axially movable, said magnetic flux generating means being constructed to pass flux through said first and second laminations in a direction perpendicular to the plane of said first and second laminations whereby said armature is moved in the direction of said first portion responsive to generation of magnetic flux, said first and second laminations being positioned between said armature and said first portion to be compressed into driving engagement by said armature upon energization of said flux generating means, said first and second armature rings providing an equally distributed force over the engaged surface of said laminations, the portion of said driving and driven members attached to said first and second laminations being constructed of non-magnetic material whereby magnetic flux cannot by-pass said laminations.

References Cited in the file of this patent

UNITED STATES PATENTS

| 754,291 | Eastwood | Mar. 8, 1904 |
| 918,254 | Ast | Apr. 13, 1909 |
| 1,340,885 | Fuller | May 25, 1920 |
| 1,493,237 | Birkigt | May 6, 1924 |
| 2,135,126 | Harwood | Nov. 1, 1938 |
| 2,254,625 | Ryba | Sept. 2, 1941 |
| 2,305,788 | Kemmler | Dec. 22, 1942 |
| 2,875,875 | Prahauser et al. | Mar. 3, 1959 |

FOREIGN PATENTS

| 472,567 | Germany | Mar. 2, 1929 |
| 516,963 | Great Britain | Jan. 16, 1940 |
| 533,260 | Great Britain | Feb. 10, 1941 |

OTHER REFERENCES

Ser. No. 322,595, Maier et al. (A.P.C.), published May 18, 1943.